United States Patent
Ullstig

[11] 3,762,793
[45] Oct. 2, 1973

[54] OPTICAL COMPENSATION DEVICE

[75] Inventor: Stig Leopold Ullstig, Stockholm, Sweden

[73] Assignee: AGA Aktiebolag, Lidingo, Sweden

[22] Filed: May 24, 1972

[21] Appl. No.: 256,302

[52] U.S. Cl. .................................. 350/6, 350/190
[51] Int. Cl. ........................................ G02b 17/00
[58] Field of Search ................. 350/6, 7, 286, 287, 350/190; 178/7, 6; 250/236

[56] References Cited
UNITED STATES PATENTS

| | | | |
|---|---|---|---|
| 3,617,106 | 11/1971 | Bjork | 350/7 |
| 2,719,457 | 10/1955 | Tripp | 350/190 |
| 2,303,113 | 11/1942 | Eckel | 350/190 |
| 3,511,551 | 5/1970 | Matulka | 350/6 |

*Primary Examiner*—David Schonberg
*Assistant Examiner*—Michael J. Tokar
*Attorney*—Lawrence I. Lerner et al.

[57] ABSTRACT

An optical compensation device precompensates optical aberrations which are not rotational-symmetrical but symmetrical in relation to two or more perpendicular, possibly equiangularly turned planes through the optical axis. Such aberrations develop in optical systems in which an optical image is being scanned in two dimensions by means of two or more prisms which during the scanning operation rotate around axes perpendicular to each other and to the optical axis. At least two cylinder lenses the axes of which coincide with the optical axis, which lenses are spaced a short distance relative to the focal length of the lenses and which are positioned symmetrically relative to the plane of symmetry of the aberrative images or one or more pairs of perpendicularly crossed lenses, both lenses in one pair having the same refractive power, the axes of which lenses coincide with the optical axis and are mutually spaced a short distance relative to the focal length of the lenses, effect the precompensation operation. One or more rotational-symmetrical lenses generate arbitrary refractive power and corrects rotational-symmetrical aberrations of the image.

8 Claims, 2 Drawing Figures

OPTICAL COMPENSATION DEVICE

BACKGROUND OF THE INVENTION

The present invention refers to compensation of optical aberrations which are not rotational-symmetrical but symmetrical in relation to two or more perpendicular, possibly equiangularly turned planes (i.e. 45° between the planes) through the optical axis.

Such aberrations develop for instance in optical systems in which an optical image is being scanned in two dimensions by means of one pair of rotating prisms which are perpendicular to each other and to the optical axis of the system.

Heretofore it has not been possible in a satisfying manner to compensate such optical aberrations. Accordingly, one object of the present invention is to accomplish a compensation or precompensation device which to low costs provides a satisfying solution of the said problem.

Compensation and precompensation devices according to the invention fulfilling this and other objects are defined in the attached claims.

SUMMARY OF THE INVENTION

The optical compensation device must compensate such optical aberrations which are symmetrical in relation to at least two orthogonal planes through the optical axes of the system but which are not rotational-symmetrical. This is especially necessary for the precompensation of such optical aberrations which develop in optical systems in which the optical image is being scanned in two dimensions by means of two or more prisms which during the scanning operation rotate around axes which are perpendicular to each other and to the optical axes. The compensation is achieved by utilizing at least two cylindrical lenses, the axes of which coincide with the optical axis of the system and which are mutually spaced a short distance relative to the focal distance of the lenses. The cylindrical lenses are positioned symmetrically relative to the plane of symmetry of the aberrative image. Additionally, one or more additional rotational-symmetrical lenses can be added to bring about correction of any possible remaining rotational-symmetrical aberration of the image.

If the device is utilized for compensating optical operations which are not rotational-symmetrical but symmetrical relative to four equiangular turned planes through the optical axis, the compensation is achieved by one or more pairs of perpendicular crossed lenses, with both lenses in one pair having the same refractive power, and the axes of the lenses coincide with the optical axis and are mutually spaced a short distance relative to the focal length of the lenses. In the latter case, the prisms which scan the optical image in two dimensions, are of equal thickness and the crossed lenses are cylindrical lenses with the planes of symmetry of the crossed lenses of the different pairs coinciding with the planes of symmetry of the aberrative image. Further, the planes of symmetry of the different pairs of cylindrical lenses are perpendicular relative to the planes of symmetry of the aberrative image.

The present invention also contemplates an optical precompensation device of optical aberrations which are not rotational-symmetrical, but symmetrical in relation to two planes which are perpendicular to each other through an optical system and which develop in optical systems in which an optical image is being scanned two dimensions by two or more prisms which during the scanning operation rotate around axes which are perpendicular to each other and to the optical axis. The precompensation device includes one or more sets of cylindrical lenses with each set comprising at least two afocal cylindrical lens systems with the systems of each set being arranged symmetrically relative to the plane of symmetry of the aberrative image and so that the planes of symmetry of the system lie in the optical axis. As many sets of cylindrical lenses are provided as are necessary for arbitrary correction of the symmetry of the aberrative optical image.

The afocal cylindrical lens systems may provide arbitrary enlargement depending on the anamorphy desired in the system. Further, in each of the afocal cylindrical lens systems all cylinder-generatrices are in parallel.

Further objects of the invention and advantages obtained therefrom will appear from the description given below of two examples of the invention which are illustrated on the attached schematic drawing.

DETAILED DESCRIPTION OF THE DRAWING

Figure 1:
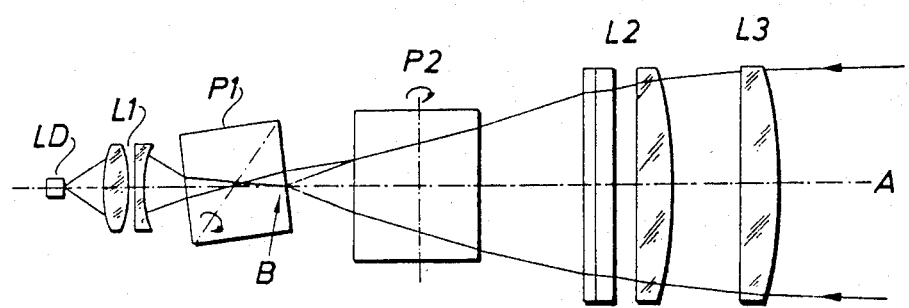
FIG. 1 shows a precompensation device for optical aberrations which are not rotational-symmetrical but symmetrical in relation to four equiangularly turned planes.

Referring to FIG. 1 LD denotes a light detector for receiving visible or infrared rays. The light detector lies in the focal plane of an axial-symmetrical converging lens system L1, forming a part of the optical system. To this also belongs a second axial-symmetrical lens system L2 comprising an orthogonal pair of cylinder lenses. The lenses belonging to this pair have the same refractive power and their axes coincide with the optical axis. The lenses are positioned closely adjacent each other so that their mutual distance is substantially less than the focal distance. Between the systems there is one pair of scanning prisms P1 and P2 of equal thickness, which can rotate around axes which are perpendicular to each other and to the optical axis A. The four units LD, L1, P1 and P2 scan an optical image B. The orthogonal cylinder lens pair L2 corrects the asymmetry of the aberrations of the image and possibly also partly the symmetrical aberrations. A rotational-symmetrical lens L3 provides the desired focal distance to the system and corrects remaining rotational-symmetrical aberrations of the image.

By chosing a sufficient number of pairs of crossed cylinder lenses L2 a possiblity is obtained arbitrarily to compensate the asymetry of the aberrations of the optical image. Each of the crossed cylinder lens pairs will then, as a pair, axially seen, comprise a rotational-symmetrical lens wherein the aberrations which are being developed have the same plane of symmetry as the aberrations of the aberrative optical image.

Figure 2:
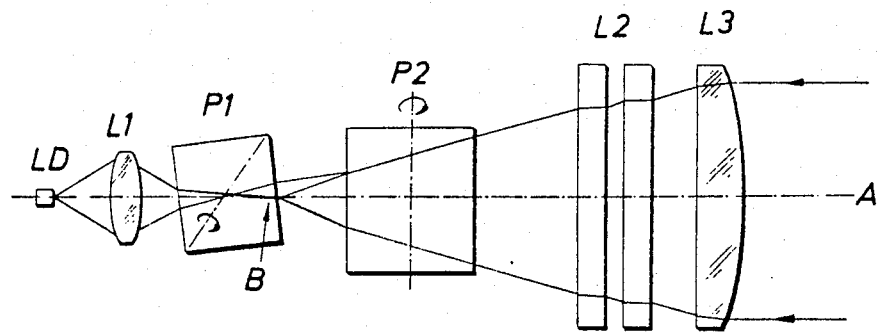
FIG. 2 is a view corresponding to FIG. 1 and showing a precompensation device for optical aberrations which are symmetrical in relation to two perpendicular planes through an optical axis.

The precompensation device illustrated in FIG. 2 is intended to be used for the compensation of such optical aberrations which are not rotational-symmetrical but symmetrical around two orthogonal planes thorugh the optical axis.

LD is a light detector for receiving visible or infrared rays. The light detector lies in the focal plane of an axial-symmetrically coverging lens system L1 forming part of the optical system. A set of cylinder lenses L2 also belongs thereto. Between the systems there is a pair of scanning prisms P1 and P2 which can rotate around axes which are perpendicular to each other and to the optical axis A.

Owing to the fact that the two prisms are perpendicular to each other the resulting aberration is approximatively distributed around the optical axis A. The set L2 of cylinder lenses comprising two afocal cylinder lenses which are oriented in general in parallel with the diagonals of the aberrative image correcting the asymmetry of the aberrations and possibly also, partly, the rotational-symmetrical aberrations of the aberrative optical image. The rotational-symmetrical lens L3 provides the desired focal distance and corrects remaining rotational-symmetrical aberrations of the image.

By using a suitable number of sets of cylinder lenses L2 arbitrary correction of the asymmetry of the aberrative image can be obtained.

The afocal cylinder lens systems may give rise to arbitrary enlargement which, however, depends upon if there is a wish to give rise to anomorphy in the system. In each of the afocal cylinder lens systems all cylinder-generatrices shall be in parallel.

Although this invention has been described with respect to its preferred embodiments, it should be understood that many variations and modification will now be obvious to those skilled in the art, and it is preferred, therefore, that the scope of the invention be limited, not by the specific disclosure herein, only by the appended claims.

What is claimed is:

1. An optical compensation device for the compensation of such optical aberrations which are other than rotational-symmetrical but symmetrical in relation to at least two orthogonal planes through the optical axis, especially for the precompensation of such optical aberrations which develop in optical systems in which an optical image is being scanned in two dimensions by means of two prisms which during the scanning operation rotate around axes which are perpendicular to each other and to the optical axis, comprising, an optical system having an optical axis, said optical system including at least two prisms which during a scanning operation rotate around axes which are perpendicular to each other and to the optical axis of the system, at least two cylindrical lenses, the axes of which coincide with the optical axis of the system and which cylindrical lenses are mutually spaced a short distance relative to the focal length of the cylindrical lenses, said cylindrical lenses being positioned symmetrically relative to the planes of symmetry of the aberrative image.

2. The optical compensation device of claim 1 including additional rotational-symmetrical lenses positioned along the optical axis to correct rotational-symmetrical aberrations of the image.

3. An optical precompensation system for optical aberrations which are other than rotational-symmetrical but symmetrical relative to for equiangular turned planes through the optical axis and which develop in optical systems in which an optical image is being scanned in two dimensions by means of at least two prisms, comprising an optical system have an optical axis, said optical system including at least two prisms which during the scanning operation, rotate around axes which are mutually perpendicular and perpendicular to the optical axis during a scanning operation, at least one pair of lenses having their optical axes perpendicularly crossed, both crossed lenses in one pair having the same refractive power, the axes of said perpendicularly crossed references coinciding with the optical axis of said optical system, said pair of perpendicularly crossed lenses being spaced from one another a short distance relative to the focal length of the lenses.

4. The precompensation device of claim 3 wherein said prisms are of equal thickness, said crossed lenses comprising cylindrical lenses, the planes of symmetry of the cylindrical lenses of the different pairs of lenses coinciding with the planes of symmetry of the aberrative image.

5. The precompensation device in accordance with claim 3 including at least one additional rotational-symmetrical lens correcting rotational-symmetrical aberrations of the image.

6. An optical precompensation device of optical aberrations which are other than rotational-symmetrical but symmetrical in relation to two planes which are perpendicular to each other through an optical axis and which develop in optical systems in which an optical image is being scanned in two dimensions by means of at least two prisms which during the scanning operation rotate around axes which are perpendicular to each other and to the optical axis, comprising an optical system including at least two prisms, said prisms being operative during the scanning operation to rotate around axes which are perpendicular to each other and to the optical axis of the system, said set of cylindrical lenses comprising at least two afocal cylindrical lens systems, at least one set of cylindrical lenses being arranged symmetrically relative to the plane of symmetry of the aberrative image so that the planes of symmetry of the cylinder lens system lie in the optical axis.

7. A precompensation device in accordance with claim 6 including additional sets of cylinder lenses similar to said first mentioned set to achieve correction of the asymmetry of the aberrative optical image.

8. The precompensation device of claim 6 wherein each of the cylinder lens systems cylinder-generatrices are in parallel.

* * * * *